US012756425B2

(12) United States Patent
Fang

(10) Patent No.: US 12,756,425 B2
(45) Date of Patent: Oct. 6, 2026

(54) TRANSMISSION METHOD AND APPARATUS, DEVICE, AND READABLE STORAGE MEDIUM

(71) Applicant: DATANG MOBILE COMMUNICATIONS EQUIPMENT CO., LTD., Beijing (CN)

(72) Inventor: Liang Fang, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 159 days.

(21) Appl. No.: 18/839,202

(22) PCT Filed: Jan. 9, 2023

(86) PCT No.: PCT/CN2023/071352
§ 371 (c)(1),
(2) Date: Aug. 16, 2024

(87) PCT Pub. No.: WO2023/155645
PCT Pub. Date: Aug. 24, 2023

(65) Prior Publication Data

US 2025/0167834 A1 May 22, 2025

(30) Foreign Application Priority Data

Feb. 17, 2022 (CN) ......................... 202210146253.4

(51) Int. Cl.
*H04B 7/024* (2017.01)
*H04L 5/00* (2006.01)
*H04W 76/20* (2018.01)

(52) U.S. Cl.
CPC ........... *H04B 7/024* (2013.01); *H04L 5/0048* (2013.01); *H04W 76/20* (2018.02)

(58) Field of Classification Search
CPC ....... H04B 7/024; H04B 7/022; H04L 5/0048; H04W 76/20; H04W 92/20; H04W 24/02; H04W 24/10
See application file for complete search history.

(56) References Cited

U.S. PATENT DOCUMENTS

2015/0349854 A1 12/2015 Zhao et al.
2019/0327621 A1 10/2019 Chou et al.
(Continued)

FOREIGN PATENT DOCUMENTS

CN 103929771 A 7/2014
CN 106559888 A 4/2017
(Continued)

OTHER PUBLICATIONS

3GPP, "3rd Generation Partnership Project: Technical Specification Group Radio Access Network; NG-RAN; F1 Application Protocol" Release 16, 3GPP Draft, 38473-G80, 3GPP, Mobile Competence Centre, France, V16.8.0 Dec. 23, 2021. (Year: 2021).*
First Office Action issued Nov. 7, 2025 in Chinese Application No. 202210146253.4.
(Continued)

*Primary Examiner* — Sung S Ahn
(74) *Attorney, Agent, or Firm* — Harness, Dickey & Pierce, P.L.C.

(57) ABSTRACT

Disclosed in the present disclosure are a transmission method and apparatus, a device, and a readable storage medium, the method comprising: a CU sends a first message to a DU by means of a first interface, the first message indicating information of a coordination cell of a terminal configured by the DU.

20 Claims, 8 Drawing Sheets

(56) References Cited

U.S. PATENT DOCUMENTS

| | | | | |
|---|---|---|---|---|
| 2019/0373627 | A1* | 12/2019 | Luo | H04W 72/542 |
| 2021/0126738 | A1* | 4/2021 | Vankayala | H04W 88/08 |
| 2021/0176802 | A1 | 6/2021 | Sirotkin et al. | |
| 2021/0243617 | A1 | 8/2021 | Cooper et al. | |
| 2021/0385661 | A1* | 12/2021 | Centonza | H04W 16/14 |
| 2022/0039133 | A1 | 2/2022 | Mering et al. | |
| 2022/0394570 | A1 | 12/2022 | Han et al. | |

FOREIGN PATENT DOCUMENTS

| | | | |
|---|---|---|---|
| CN | 111093236 | A | 5/2020 |
| WO | 2022/031098 | A1 | 2/2022 |

OTHER PUBLICATIONS

3GPP TS 38.473, "38.473 v050-rm", Dec. 11, 2017.

Extended European Search Report issued May 8, 2025 in European Application No. 23755649.3.

"3rd Generation Partnership Project; Technical Specification Group Radio Access Network; NG-RAN; F1 application protocol (F1AP) (Release 16)," 3GPP DRAFT; 38.473-680, retrieved on Dec. 23, 2021.

"3rd Generation Partnership Project; Technical Specification Group Radio Access Network; NR; NR and NG-RAN Overall Description; Stage 2 (Release 16)," 3GPP TS 38.300, retrieved on Dec. 23, 2021.

"3rd Generation Partnership Project; Technical Specification Group Radio Access Network; NG-RAN; Architecture description (Release 16)," 3GPP TS 38.401, retrieved on Dec. 23, 2021.

International Search Report and Written Opinion issued on Mar. 22, 2023 in International Application No. PCT/CN2023/071352.

* cited by examiner

| Bits | | | | | | | | Number of Octets |
|---|---|---|---|---|---|---|---|---|
| 7 | 6 | 5 | 4 | 3 | 2 | 1 | 0 | |
| PDU Type (=2) | | | | PDCP Dupl. Ind. | Assistance Information. Index | UL Delay Index. | DL Delay Index. | 1 |
| Spare | | | | | | | PDCP Duplication Activation Suggestion | 1 |
| Number of Assistance Information Fields | | | | | | | | 0 or 1 |
| Assistance Information Type | | | | | | | | 0 or (2* Number of Assistance Info Fields）+sum of Number of octets for Radio Quality Assistance Information Fields) |
| Number of octets for Radio Quality Assistance Information Fields | | | | | | | | |
| Radio Quality Assistance Information | | | | | | | | |
| UL Delay DU Result | | | | | | | | 0 or 4 |
| DL Delay DU Result | | | | | | | | 0 or 4 |

FIG.5

TRANSMISSION METHOD AND APPARATUS, DEVICE, AND READABLE STORAGE MEDIUM

CROSS-REFERENCE TO RELATED APPLICATIONS

This application is the U.S. national phase of PCT Application No. PCT/CN2023/071352 filed on Jan. 9. 2023. which claims a priority to Chinese Patent Application No. 202210146253.4 filed on Feb. 17, 2022, the disclosures of each of which are incorporated in their entirety by reference herein.

TECHNICAL FIELD

The present disclosure relates to the technical field of communications, and in particular, to a transmission method, apparatus and device, and a readable storage medium.

BACKGROUND

Coordinated Multiple Points (CoMP) transmission refers to a plurality of transmission points separated geographically, cooperatively participate in data transmission (Physical Downlink Shared Channel (PDSCH)) of one terminal or jointly receive data (a Physical Uplink Shared Channel (PUSCH)) sent by one terminal, and the plurality of transmission points participating in coordination may be different cells of the same base station, or may be base stations of different cells, or may be different transmission units in a same cell.

According to different transmission schemes, CoMP technology may be divided into two types: joint processing technology and coordinated scheduling (CS)/downlink CoMP beam forming technology (Coordinated Beam Forming, CBF). Joint processing is further divided into uplink joint reception (CoMP Joint Reception, CoMP JR) and downlink joint transmission (CoMP JT).

The uplink CoMP JR technology refers to that the uplink signal sent by one user terminal is jointly received by a plurality of receiving nodes, the serving cell is defined as the actual home cell of the user, the coordinated cell is another cell jointly receiving the uplink signal, and the serving cell and the coordinated cell receive the uplink signal sent by the terminal at the same time, and jointly make a decision by means of coordination. The uplink COMP obtains the receiving diversity gain by performing joint processing on the signals received by the plurality of cells, thereby improving the receiving performance of the user at a cell edge. The Medium Access Control (MAC) layer of the serving cell needs to maintain the coordinated cell list for notifying the coordinated cell to receive the uplink signal.

In the downlink CoMP JT technology, on the same time-frequency resource, a plurality of transmission points simultaneously transmit data to a User Equipment (UE), and signals from the plurality of transmission points are superposed in the air, so that the signal of the receiving end is enhanced, the interference sources are reduced, and the interference becomes weak. The downlink joint transmission may be divided into coherent JT and incoherent JT, and the coherent JT means that the base station side adjusts the phase of the transmitting end, so that same phases of the signals of the plurality of transmission points are superposed on the receiving side; and the non-coherent JT is that the same phases of the signals of the plurality of transmission points are not ensured to be superposed at the UE, but signal amplitude superposition is achieved, and theoretically speaking, coherent JT performance is better than the incoherent JT performance. The MAC layer of the serving cell needs to maintain the coordinated cell list for transmitting the user layer data to the physical layer of the coordinated cells for transmission.

The downlink CoMP CS is used for a scenario in which a user is at a cell edge, and is subjected to a very large neighbor-cell intra-frequency interference. In order to suppress or eliminate such interference, frequency domain resources between a CS UE in a serving cell and a UE in a coordinated cell need to be staggered, and a physical resource block (PRB) occupying the same PDSCH time-frequency resource as that occupied by the CS UE in the coordinated cell is subjected to muting processing, resource allocation is not performed, and no UE is scheduled. As shown in FIG. 1:

The MAC layer of the serving cell needs to maintain the coordinated cell list to notify the time-frequency resource occupied by the serving cell of the coordinated cell to the MAC layer of the coordinated cell, and the coordinated cell does not allocate the time-frequency resource for which the serving cell applies for coordination when the corresponding PDSCH is scheduled, and does not schedule any UE.

The downlink CoMP CBF (cooperative beamforming) selects the cooperative UE according to the channel correlation between the CBF UE and the UE in the coordinated cell, so that the channel correlation between the CBF UE and the UE in the coordinated cell is relatively low, so as to reduce the beam interference of the cooperative UE to the CBF UE, thereby improving the performance of the CBF UE. Similar to the downlink CoMP JT and the downlink CoMP CS, the serving cell also needs to maintain the coordinated cell list to notify the coordinated cell of the time-frequency resource occupied by the serving cell, and the coordinated cell selects a time-frequency resource for pairing according to the channel correlation on the corresponding time-frequency resource to select an appropriate cooperative UE.

In the related art, a new architecture is introduced for a 5G next generation radio access network (NG-RAN), and a gNB central unit (gNB-CU) and a gNB distribution unit (gNB-DU) are defined. The gNB-CU is used as a logical unit responsible for Radio Resource Control (RRC), a Service Data Adaptation Protocol (SDAP), and a Packet Data Convergence Protocol (PDCP) and controlling the plurality of gNB-DUs connected to the gNB-DU through the first interface. The gNB-DU serves as a logical unit responsible for a radio link control protocol (RLC) layer, a MAC layer, and a physical layer (PHY) layer of a base station, one gNB-DU may support one or more cells, one cell is supported by only one gNB-DU, and is connected to the gNB-CU through the F1 interface. An architecture diagram of the NG-RAN is shown in FIG. 2.

The F1 interface is configured to connect the gNB-CU and the gNB-DU in the NG-RAN. The F1 interface is responsible for a user context management function, including establishment of a user context, establishment and modification of a data radio bearer (DRB)/signaling radio bearer (SRB), establishment and modification of a special cell (SpCell), establishment and modification of a secondary cell (SCell), and the like. An F1 interface and an F1 AP are defined in the related art. However, the current F1 interface does not define the parameters for the establishment and modification of the coordinated cell in CoMP. The F1-U interface is defined in the related art, and is used for protocol transmission of the user plane.

In the related art, the network assisted interference cancellation and suppression (NAICS) of the RRC layer is introduced, and the UE reduces the interference of the Aggregate cell on the PDSCH and the cell-specific reference signal (CRS) according to the NAICS information (establishing the relationship between the serving cell and the Aggregate cell at the UE side), configured by the base station, of the interfering source cell (Aggressor). From the perspective of establishing the relationship between the serving cell and the Aggregate cell, it is similar to the CoMP above, but CoMP is focused on that the base station side maintains the relationship between the serving cell and the coordinated cell, and the UE does not know.

FIG. 3 is a message interaction diagram of configuration modules of a coordinated cell supporting CoMP based on a CU-DU architecture. It can be seen from the figure that the gNB-CU needs to notify the gNB-DU of coordinated cell information through the F1 interface. (here, F1AP is an abbreviation of F1 interface Application Protocol (F1 Interface Application Layer Protocol)).

FIG. 4 shows a message interaction diagram of module collaboration supporting CoMP based on a CU-DU architecture. It can be seen from the figure that the gNB-DU sends a collaboration request (including the time-frequency domain resource requested for coordination) to the gNB-CU through the F1 interface based on the coordinated cell information. The gNB-CU collects collaboration requests sent by the gNB-DUs, performs resource coordination centrally according to a time-frequency domain resource requested for corporation and the relationship between the serving cell and the coordinated cell, and then sends a collaboration response to the gNB-DU through the F1 interface. In addition, the gNB-CU needs to send a cooperative reservation message to the gNB-DU where the coordinated cell is located, to reserve the specified CoMP time-frequency resource.

In addition to the coordination between the CoMP serving cell and the coordinated cell above, for the uplink CoMP JR and the downlink CoMP JT, the serving cell also needs to know the sounding reference signal (SRS) measurement value of the coordinated cell, including the reference signal received power (RSRP), the timing advance (TA), and the SRS feature vector.

At present, how a CU-DU architecture supports CoMP functions is an urgent problem to be solved.

SUMMARY

Embodiments of the present disclosure provide a transmission method, a transmission apparatus, a device, and a readable storage medium, which can solve the problem of how a CU-DU architecture supports a CoMP function.

According to a first aspect, a transmission method is provided, which is applied to a network side device, where the network side device includes a CU and a DU, and includes: sending a first message to the DU by the CU through a first interface, wherein the first message indicates information of a coordinated cell of a terminal configured by the DU.

Optionally, the coordinated cell of the terminal is a coordinated cell newly added to or deleted from a terminal context.

Optionally, the first message is a terminal context modification request message.

Optionally, the terminal context modification request message includes a predefined coordinated cell field, and the predefined coordinated cell field represents the information of the coordinated cell of the terminal.

Optionally, the method further includes: receiving a second message by the CU; and determining the first message by the CU based on the second message.

Optionally, receiving the second message by the CU includes: receiving the second message by the CU from an Operation Administration and Maintenance Management (OAM), wherein the second message indicates that the coordinated cell of the terminal is configured by the DU; or, receiving the second message from the terminal by the CU, wherein the second message is a measurement report reported by the terminal.

Optionally, the second message includes a list of newly added coordinated cells, and the list of newly added coordinated cells includes an identity of a newly added coordinated cell; or the second message includes a coordinated cell release list, and the coordinated cell release list includes an identity of a deleted coordinated cell.

Optionally, the method further includes: storing the information of the coordinated cell of the terminal in a Media Access Control (MAC) layer of the DU by the DU according to the information of the coordinated cell of the terminal, wherein the MAC layer of the DU performs Coordinated Multiple Points (CoMP) resource coordination according to the coordinated cell of the terminal.

Optionally, the method further includes: sending a third message to the CU by the DU through the first interface; wherein the third message is configured to request to reserve CoMP resources for CoMP coordination interaction between the CU and the DU.

Optionally, the method further includes: receiving, by the DU through the first interface, a fourth message sent by the CU and configured to respond to the third message.

Optionally, the fourth message includes a time unit in which CoMP coordination takes effect, and/or information about a CoMP resource corresponding to a time unit in which CoMP coordination takes effect.

Optionally, the method further includes: sending a fifth message by the CU to the DU through the first interface; wherein the fifth message is configured to notify the DU to reserve CoMP resources for CoMP coordination interaction between the CU and the DU.

Optionally, the first message or the third message or the fourth message or the fifth message is further configured to request interference coordination resources.

Optionally, the method further includes: sending assistance information data to the CU by the DU, and/or sending assistance information data to the DU by the CU; wherein the assistance information data includes an assistance channel quality information type, and the assistance channel quality information type is configured to determine whether to perform CoMP joint reception JR or CoMP downlink joint transmission JT.

Optionally, the method further includes: obtaining a measurement value of a serving cell by the CU and/or the DU; determining whether to perform the CoMP JR or the CoMP JT according to the measurement value and the assistance channel quality information type by the CU and/or the DU.

Optionally, the assistance channel quality information type includes one or more of the following: a reference signal received power of a sounding reference signal; a timing advance; a sounding reference signal feature vector, a reference signal received power of a channel state information reference signal; a reference signal received power of a synchronization signal block.

According to a second aspect, a transmission apparatus is provided, where the apparatus is applied to a network side device, and the network side device includes a CU and a DU. The apparatus includes: a first sending module, configured to send a first message to the DU through a first interface, where the first message indicates information of a coordinated cell of a terminal configured by the DU.

Optionally, the coordinated cell of the terminal is a coordinated cell newly added to or deleted from a terminal context.

Optionally, the first message is a terminal context modification request message.

Optionally, the terminal context modification request message includes a predefined coordinated cell field, and the predefined coordinated cell field represents the information of the coordinated cell of the terminal.

Optionally, the apparatus further includes: a first receiving module configured for receiving a second message; and a first processing module configured for determining the first message based on the second message.

Optionally, the first receiving module is further configured for performing one of following: receiving the second message from an Operation Administration and Maintenance Management (OAM), wherein the second message indicates that the coordinated cell of the terminal is configured by the DU; or, receiving the second message from the terminal, wherein the second message is a measurement report reported by the terminal.

Optionally, the second message includes a list of newly added coordinated cells, and the list of newly added coordinated cells includes an identity of a newly added coordinated cell; or the second message includes a coordinated cell release list, and the coordinated cell release list includes an identity of a deleted coordinated cell.

Optionally, the apparatus further includes: a second processing module, configured for storing the information of the coordinated cell of the terminal in a Media Access Control (MAC) layer of the DU according to the information of the coordinated cell of the terminal, wherein the MAC layer of the DU performs Coordinated Multiple Points (CoMP) resource coordination according to the coordinated cell of the terminal.

Optionally, the apparatus further includes: a second sending module configured for sending a third message to the CU through the first interface; wherein the third message is configured to request to reserve CoMP resources for CoMP coordination interaction between the CU and the DU.

Optionally, the apparatus further includes: a second receiving module, configured for receiving, through the first interface, a fourth message sent by the CU and configured to respond to the third message.

Optionally, the fourth message includes a time unit in which CoMP coordination takes effect, and/or information about a CoMP resource corresponding to a time unit in which CoMP coordination takes effect.

Optionally, the apparatus further includes: a third sending module, configured for sending a fifth message to the DU through the first interface; wherein the fifth message is configured to notify the DU to reserve CoMP resources for CoMP coordination interaction between the CU and the DU.

Optionally, the first message or the third message or the fourth message or the fifth message is further configured to request interference coordination resources.

Optionally, the apparatus further includes: a fourth sending module, configured for sending assistance information data to the CU, and/or sending assistance information data to the DU; wherein the assistance information data includes an assistance channel quality information type, and the assistance channel quality information type is configured to determine whether to perform CoMP joint reception JR or CoMP downlink joint transmission JT.

Optionally, the apparatus further includes: an obtaining module configured for obtaining a measurement value of a serving cell; determining whether to perform the CoMP JR or the CoMP JT according to the measurement value and the assistance channel quality information type.

Optionally, the assistance channel quality information type includes one or more of the following: a reference signal received power of a sounding reference signal; a timing advance; a sounding reference signal feature vector, a reference signal received power of a channel state information reference signal; a reference signal received power of a synchronization signal block.

According to a third aspect, a network side device is provided, including a processor, a memory, and a program stored in the memory and executable on the processor, where the program, when executed by the processor, implements the steps of the method according to the first aspect.

According to a fourth aspect, a readable storage medium is provided, where the readable storage medium stores a program or an instruction, and the program or the instruction, when executed by a processor, implements the steps of the method according to the first aspect.

In this embodiment of the present disclosure, the CU sends a first message to the DU through the first interface, where the first message indicates information of a coordinated cell of the terminal configured by the DU, so that the CU-DU architecture can support a CoMP function, and performance indexes of the edge UE can be greatly improved.

BRIEF DESCRIPTION OF THE DRAWINGS

FIG. 5 is a schematic diagram of an auxiliary information format;

DETAILED DESCRIPTION

Figure 1:
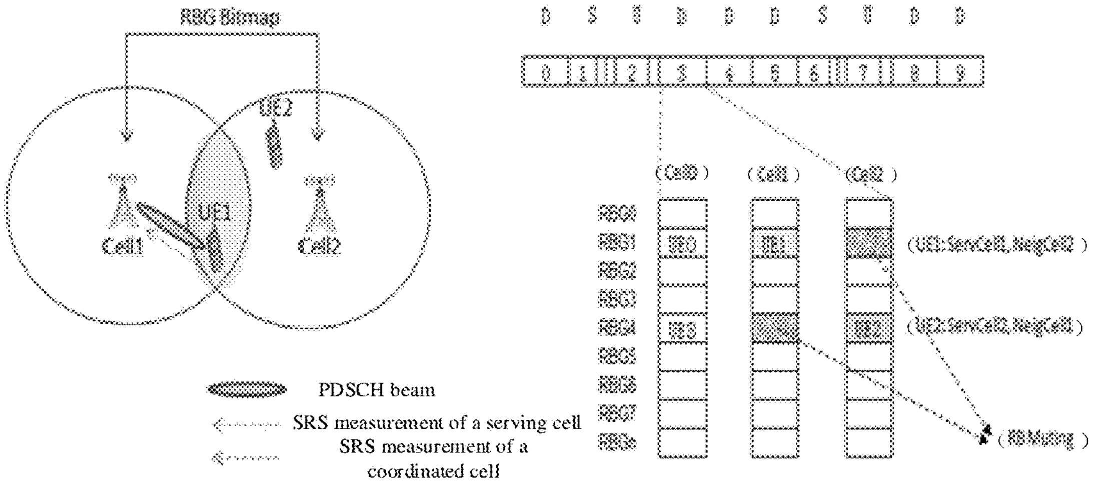
FIG. 1 is a schematic diagram in which a downlink CoMP CS is applied to a user at a cell edge.
Figure 2:
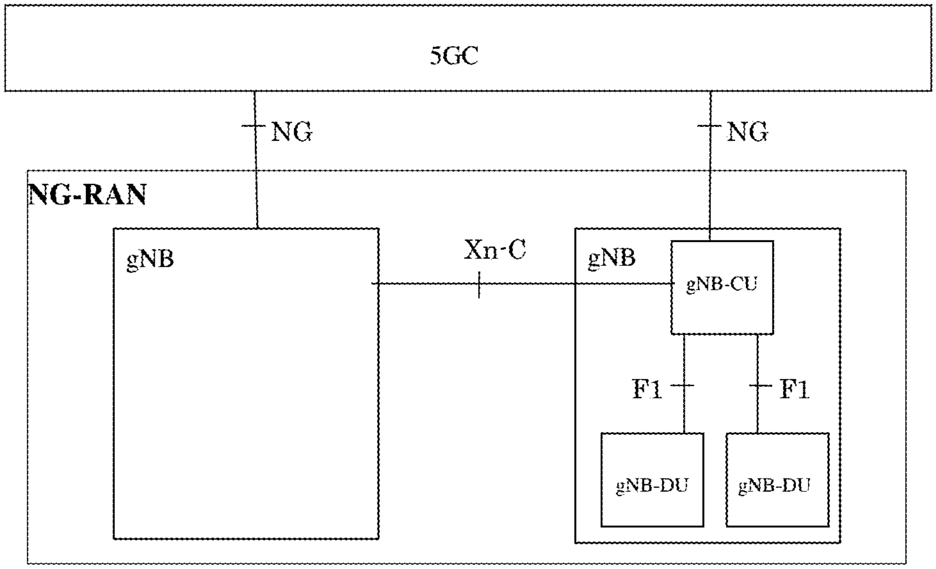
FIG. 2 is a schematic architectural diagram of an NG-RAN.
Figure 3:
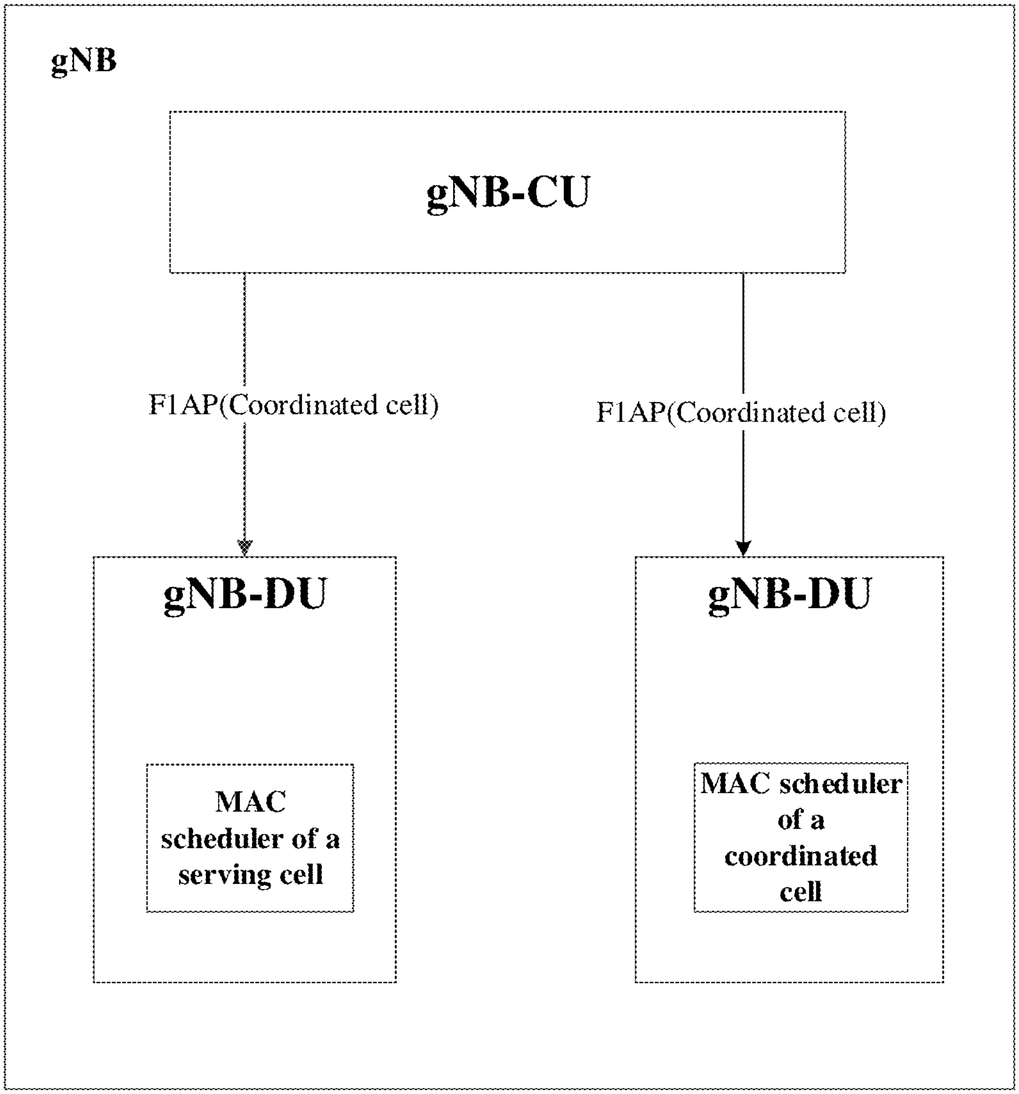
FIG. 3 is a schematic diagram of message interaction of coordinated cell configuration modules supporting CoMP based on a CU-DU architecture.
Figure 4:
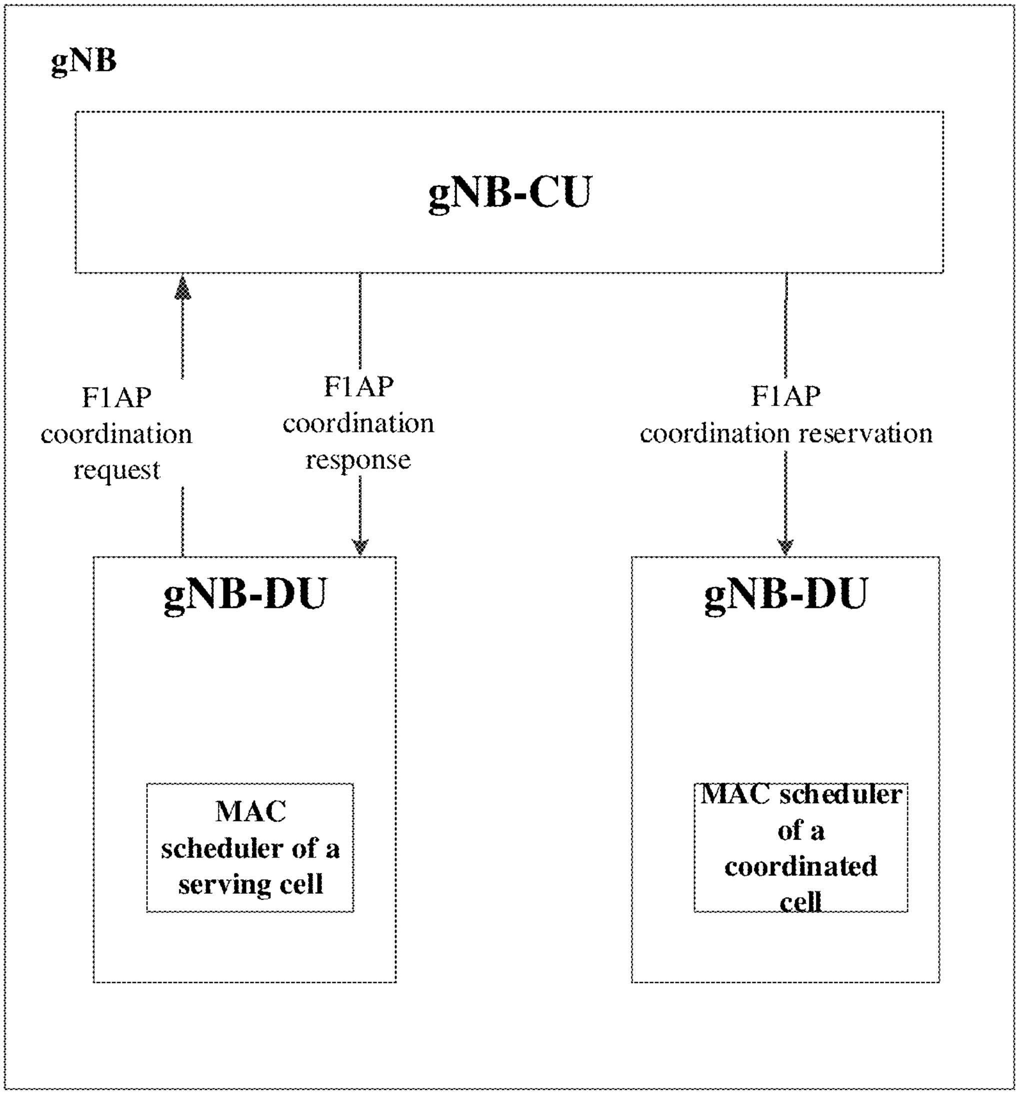
FIG. 4 is a schematic diagram of a message interaction of module coordination supporting CoMP by an architecture of an NG-RAN.

The technical solutions in the embodiments of the present disclosure will be clearly described below with reference to the accompanying drawings in the embodiments of the present disclosure, and obviously, the described embodiments are just a part but not all of the embodiments of the present disclosure. All other embodiments obtained by a person of ordinary skill in the art based on the embodiments of the present disclosure shall fall within the protection scope of the present disclosure.

In the specification and claims of the present disclosure, the terms "first", "second", and the like are intended to distinguish between similar objects, but are not used to describe a specific order or sequence. It should be understood that terms used in this way can be interchanged under appropriate circumstances, so that the embodiments of the present disclosure can be implemented in an order other than those illustrated or described herein, and objects distinguished by "first" and "second" usually belong to one type, and the number of objects is not limited, for example, the first object may be one or more. In addition, "and/or" in the specification and claims indicates at least one of the connected objects, and the character "/" generally indicates an "or" relationship between the associated objects.

Currently, since parameters for the establishment and modification of the coordinated cell of the CoMP are not defined for the F1 interface, a private field (IE Group) may be added in the UE CONTEXT MODIFICATION REQUEST defined in the related art if CoMP based on the architecture of the gNB-CU and the gNB-DU is to be supported, so as to support establishment and modification of CoMP coordinated cells. Collaboration message interaction is supported by defining a private F1 interface.

By increasing the support for the private field, scalability is poor because 3GPP will support new characteristics for adding a new field for F1AP. For example, in the related art, a Conditional Intra-DU Mobility Information field is added to a UE CONTEXT MODIFICATION REQUEST message to support a new conditional handover characteristic. Such private fields and newly defined fields in 3GPP tend to conflict.

In addition, compatibility is poor since increasing the support for the private field. If the gNB-CU of a manufacturer supports CoMP through the private field, some manufacturers only support the standard first interface, then gNB-CU and gNB-DU of different manufacturers cannot be compatible, and CoMP cannot be supported.

In addition to defining the private fields, CoMP may also be supported by reusing existing F1 fields. For example, the Resource Coordination Transfer Information field in the UE CONTEXT MODIFICATION REQUEST message is reused, and in a scenario in which dual connectivity with the eNB is not supported, the MeNB Cell ID is used to represent the coordinated cell. The disadvantage is that when it is necessary to support dual connectivity with the eNB, CoMP cannot be supported, and in addition, compatibility is poor, and gNB-CU and gNB-DU compatibility problems of different manufacturers may also exist, and if the gNB-DU of a manufacturer only supports a standard first interface, it is impossible to correctly parse the reused fields. In addition, cooperative interaction has no existing first interface that can be reused.

For CoMP UL JR and CoMP DL JT determination, a private auxiliary information type may be defined in an ASSISTANCE INFORMATION DATA message, but there is a problem of poor expansibility and poor compatibility as the cooperative interaction above.

Figure 7:
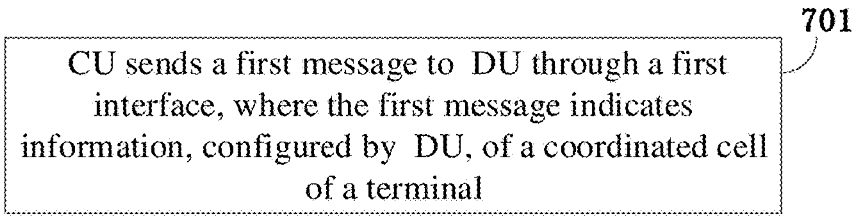
FIG. 7 is a flowchart of a transmission method according to an embodiment of the present disclosure.

Referring to FIG. 7, an embodiment of the present disclosure provides a transmission method, where an execution body of the method may be a network side device, and the network side device includes a CU and a DU. The method specifically includes following step 701.

Step 701: The CU sends a first message to the DU through a first interface, where the first message indicates information, configured by the DU, of a coordinated cell of a terminal.

The first interface is an interface between the CU and the DU, the first interface may also be described as an F1 interface, and it may be understood that a name of an interface between the CU and the DU is not limited.

In a case that the first interface is an F1 interface, the 3GPP new F1 interface modification may be based on a defined interface parameter and a coordinated cell field, so that an existing function is not affected, and good expandability is achieved. The compatibility is good, and gNB-CP and gNB-DU of different manufacturers are both implemented according to the F1 interface, so long as the F1 interface definition requirement is met, interconnection and intercommunication can be achieved, and mutual compatibility is achieved. Through the new F1 interface, the CoMP function based on the CU-DU architecture is supported, and the performance index of the UE at the cell edge can be greatly improved.

In an implementation of the present disclosure, the coordinated cell of the terminal is a coordinated cell newly added or deleted by a terminal context.

In an implementation of the present disclosure, the first message is a terminal context modification request (UE CONTEXT MODIFICATION REQUEST) message, and the first message may also be another message, of course, it is not limited thereto.

In an implementation of the present disclosure, the terminal context modification request message includes a predefined coordinated cell field (for example, a CoMP-CoordinatedCellInfo field), where the predefined coordinated cell field represents information of a coordinated cell of the terminal.

In an implementation of the present disclosure, before step 701, the method may further include: the CU receives a second message; and then, the CU determines the first message based on the second message.

There are two ways to establish the relationship between the serving cell and the coordinated cell. One ways is that an Operation Administration and Maintenance (OAM) layer notifies the MAC layer by configuring a Radio Resource Control (RRC) layer, and the other way is to report the neighboring cell to the RRC layer through the A3 event, and then the RRC notifies the MAC layer. Both methods require the RRC layer to inform the MAC layer of the established coordinated cell so that the MAC layer performs time-frequency resource coordination based on the coordinated cell.

In an implementation of the present disclosure, a manner in which the CU receives a second message includes one of the following:

Manner 1: the CU receives the second message from an OAM, where the second message indicates that a coordinated cell of the terminal is configured by the DU;

Manner 2: the CU receives the second message from the terminal, where the second message is a measurement report reported by the terminal.

The measurement report may include a neighboring cell relationship measured by the UE.

Optionally, the second message includes: a list of coordinated cells newly added (CoordinatedCellsToAddModLis), and the list of coordinated cells newly added includes an identity (ID) of a newly added coordinated cell (Coordinated Cell); or, the second message includes a Coordinated Cell Release List, and the coordinated cell release list includes an identity of a deleted coordinated cell.

In an implementation of the present disclosure, the method may further include: the DU stores the information of the coordinated cell of the terminal in a Medium Access Control (MAC) layer of the DU according to the information of the coordinated cell of the terminal, and the MAC layer of the DU performs CoMP resource coordination according to the coordinated cell of the terminal.

In an implementation of the present disclosure, the method may further include: sending, by the DU, a third message (or described as an F1 CoMP coordination request message) to the CU through the first interface; and the third message is used to request to reserve CoMP resources for CoMP coordinated interaction between the CU and the DU.

In an implementation of the present disclosure, the method may further include: the DU receives, through the first interface, a fourth message sent by the CU and configured to respond to the third message (or is described as an F1 CoMP coordinated response message).

In an implementation of the present disclosure, the fourth message may include a time unit (for example, a slot) in which CoMP coordination takes effect, and/or information about a CoMP resource corresponding to a time unit in which CoMP coordination takes effect.

In an implementation of the present disclosure, the method may further include: sending, by the CU, a fifth message (or described as a F1 CoMP coordinated reservation message) to the DU through the first interface; and the fifth message is used to notify the DU to reserve CoMP resources for CoMP coordinated interaction between the CU and the DU.

In an implementation of the present disclosure, the first message or the third message or the fourth message or the fifth message is further used to request interference coordination resources.

In an implementation of the present disclosure, the method further includes: the DU sends assistance information data (ASSISTANCE INFORMATION DATA) to the CU, and/or the CU sends assistance information data to the DU; the auxiliary information data includes an auxiliary channel quality information (Radio Quality Assistance Information) type, and the auxiliary channel quality information type is used to determine whether to perform CoMP JR or CoMP JT.

For example, ASSISTANCE INFORMATION DATA is defined for transferring Radio Quality Assistance Information (Auxiliary Channel Quality Information) between serving cells on F1-U, as shown in FIG. 5. Following auxiliary information types are supported: {0=Unknown, 1=Average Channel Quality Indicator (Average CQI), 2=Average Hybrid Automatic Repeat Request (HARQ) Failure, 3=Average HARQ Forwarding (Retransmissions), 4=DL Radio Quality Index, 5=UL Radio Quality Index, 6=Power Headroom Report, 7-228=Reserved for Future Value Extensions, 229-255=Reserved for Test Purpose}. In order to support the serving cell to perform CoMP JR or CoMP JT determination, a new auxiliary message type needs to be added, the coordinated cell support to send the measured SRS RSRP, TA and SRS feature vectors to the serving cell through F1-U, and after obtaining the auxiliary channel quality information, the serving cell performs CoMP JR or CoMP JT determination.

In an implementation of the present disclosure, the method further includes: obtaining, by the CU and/or the DU, a measurement value of a serving cell; and determining by the CU and/or the DU whether to perform CoMP JR or CoMP JT according to the measurement value and the auxiliary channel quality information type.

Figure 6:
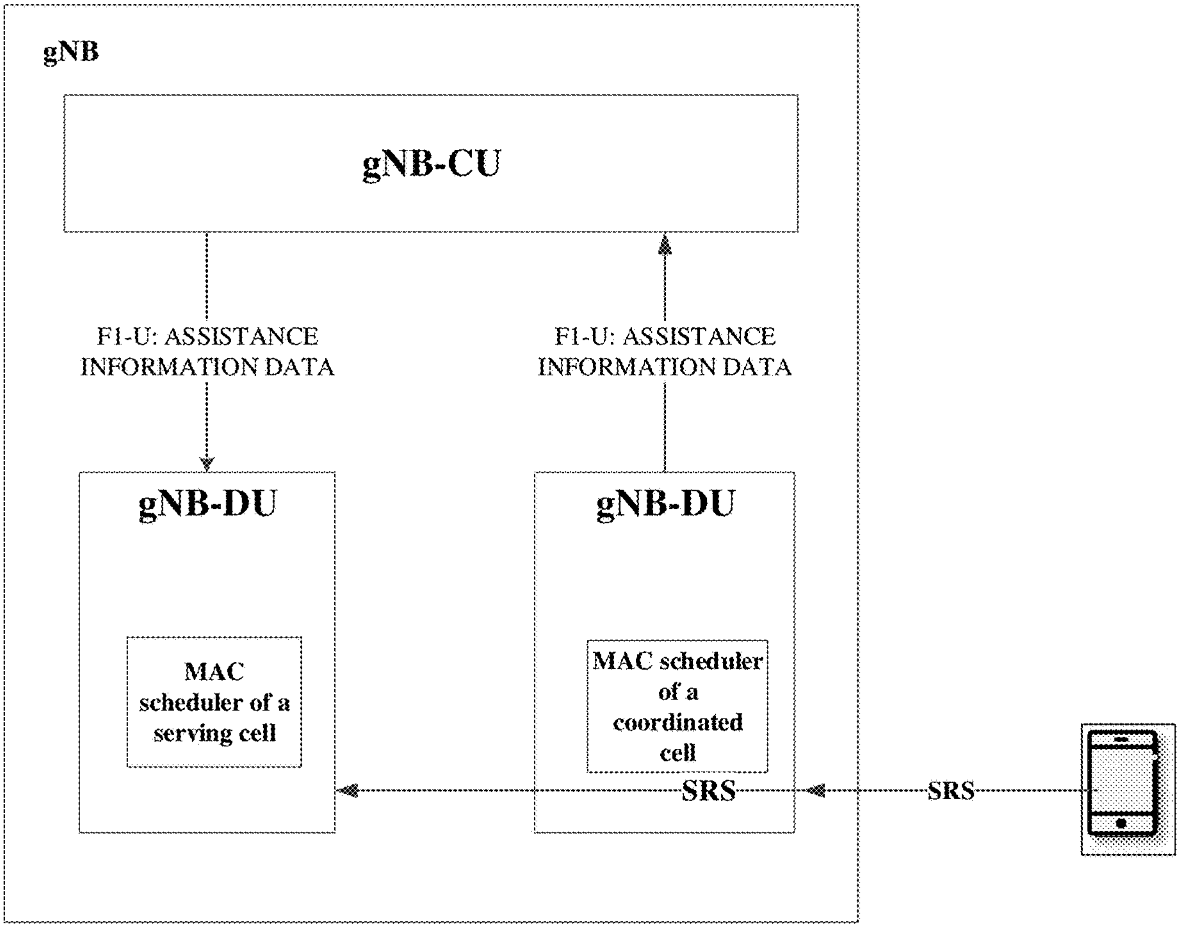
FIG. 6 is a schematic diagram of module interaction that supports CoMP UL JR or DL JT determination based on a CU-DU architecture.

For example, FIG. 6 shows a module interaction diagram that supports CoMP UL JR or DL JT determination based on a CU-DU architecture. The UE transmits the SRS, and the coordinated cell and the serving cell each detects the SRS channel. After the coordinated cell measures the SRS, the ASSISTANCE INFORMATION DATA message is sent through the F1-U interface, and the related SRS RSRP is informed to the serving cell, the measured TA value and the SRS feature vector value are notified.

Exemplarily, a value range: {0=UNKNOWN, 1=Average CQI, 2=Average HARQ Failure, 3=Average HARQ Retransmissions, 4=DL Radio Quality Index, 5=UL Radio Quality Index, 6=Power Headroom Report, 7=SRS RSRP, 8=TA, 9=SRS feature vector, 10-228=reserved for future value extensions, 229-255=reserved for test purposes}.

where "7=SRS RSRP, 8=TA, 9=SRS feature vector" is a newly defined type of auxiliary channel quality information. By defining the new type of auxiliary channel quality information, after the coordinated cell measures the SRS, the coordinated cell may set the value of the message field Assistance Information Type to the corresponding measurement type through the ASSISTANCE INFORMATION DATA message of F1-U, and fill the corresponding measurement value into the message field Radio Quality Assistance Information, and the SRS RSRP/TA/SRS feature vector is sent to the serving cell. After receiving the information/message, the serving cell may determine whether CoMP UL JR or CoMP DL JT may be performed in conjunction with the SRS measured by the serving cell.

In an implementation of the present disclosure, the type of the auxiliary channel quality information includes one or more of the following:

(1) Sounding Reference Signal (SRS) Reference Signal Received Power (RSRP);

(2) Timing Advance (TA);

(3) an SRS feature vector;

(4) a Channel State Information Reference Signal (CSI-RS) RSRP;

(5) Synchronization Signal and PBCH Block (SSB) RSRP.

In this embodiment of the present disclosure, the CU sends a first message to the DU through the first interface, where the first message indicates information of a coordinated cell of the terminal configured by the DU, so that the CU-DU architecture can support a CoMP function, and performance indexes of the UE at the edge can be greatly improved.

The embodiments of the present disclosure are described below with reference to specific examples.

Embodiment 1

By adding a new field to the UE CONTEXT MODIFICATION REQUEST message of the F1 interface, the gNB-CU is supported to add or delete the coordinated cell for the UE context in the gNB-DU through the UE CONTEXT MODIFICATION REQUEST message.

For example, at the end of the existing UE CONTEXT MODIFICATION REQUEST message, a new CoMP-CoordinatedCellInfo field is added.

The UE CONTEXT MODIFICATION REQUEST message is sent by the gNB-CU to provide UE context information changes to the gNB-DU.

TABLE 1

The format of the UE CONTEXT MODIFICATION REQUEST message.

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU UE FIAP ID | M | | 9.3.1.4 | | YES | reject |
| gNB-DU UE F1AP ID | M | | 9.3.1.5 | | YES | reject |
| SpCell ID | O | | NR CGI 9.3.1.12 | Special Cell as defined in TS 38.321 [16]. For handover case, this IE is considered as target cell. | YES | ignore |
| ServCellIndex | O | | INTEGER (0 . . . 31, . . . ) | | YES | reject |
| SpCell UL Configured | O | | Cell UL Configured 9.3.1.33 | | YES | ignore |
| Discontinuous Reception, DRX) (Cycle ) | O | | DRX Cycle 9.3.1.24 | | YES | ignore |
| . . . | . . . | . . . | . . . | . . . | . . . | . . . |
| Conditional Intra-DU Mobility Information | O | | | | YES | reject |
| >Conditional HandoverCHO Trigger | M | | ENUMERATED CHO-initiation, CHO-replace, CHO-cancel, . . . ) | | — | — |
| Candidate Cells To Be Cancelled List | C-ifCH Ocancel | 0 . . . <maxnoofCellsinCHO> | | | — | — |
| >>Target Cell ID | M | | NR CGI 9.3.1.12 | | — | — |
| >Estimated Arrival Probability | O | | INTEGER (1 . . . 100) | | YES | ignore |
| F1-C Transfer Path | O | | 9.3.1.207 | | YES | reject |
| Secondary Cell Group, SCG) Indicator | O | | ENUMERATED (released, . . . ) | This IE is used at the MN in NR-DC and NE-DC and it indicates the release of an SCG | YES | ignore |
| COMP-Coordinated CellInfo | O | | | | Yes | ignore |
| >CoordinatedCellsToAddModList | M | 0 . . . <maxnoofCoordinatedCells> | | | — | — |
| >> Coordinated Cell ID | M | | NR CGI 9.3.1.12 | Coordinated Cell Identifier in gNB | — | — |
| >CoordinatedCellsToReleaseModList | M | 0 . . . <maxnoofCoordinatedCells> | | | — | — |
| >>Coordinated Cell ID | M | | NR CGI 9.3.1.12 | Coordinated Cell Identifier in gNB | — | — |

TABLE 2

Introduction of the Largest Coordinated Cell

| Range bound | Explanation |
|---|---|
| maxnoofSCells | Maximum no. of SCells allowed towards one UE, the maximum value is 32. |
| . . . | . . . |
| maxnoofCellsinCHO | Maximum no. cells that can be prepared for a conditional mobility. Value is 8. |

TABLE 2-continued

Introduction of the Largest Coordinated Cell

| Range bound | Explanation |
|---|---|
| maxnoofCoordinatedCells | Maximum number of coordinated cells, with a value 8 |

Figure 8:
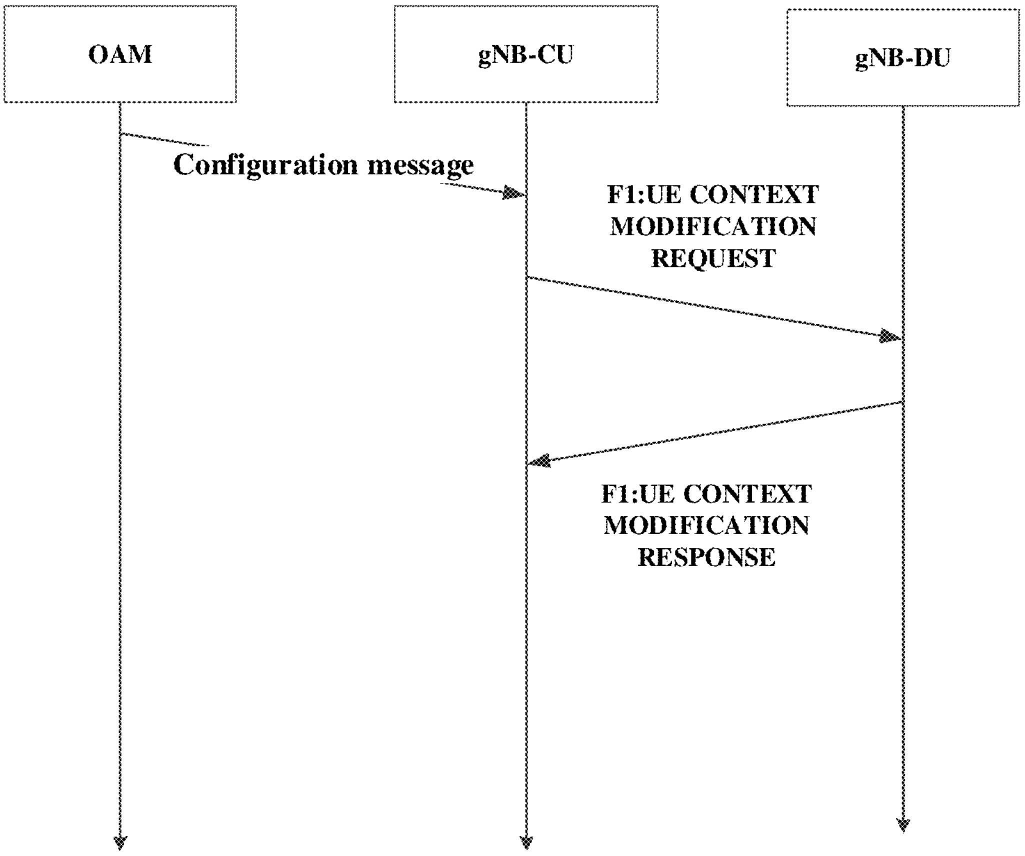
FIG. 8 is a flowchart of configuring a coordinated cell according to an embodiment of the present disclosure.

Referring to FIG. 8, a procedure of configuring a coordinated cell includes the following steps:

Step 1: an OAM sends a configuration message to a gNB-CU;

Step 2: the gNB-CU sends the UE CONTEXT MODIFICATION REQUEST message to the gNB-DU through the F1 interface;

Step 3: the gNB-DU sends the UE CONTEXT MODIFICATION RESPONSE message to the gNB-CU through the F1 interface.

The configuration message from the OAM is sent to gNB-CU to configure the coordinated cell of the UE, the gNB receives the configuration message from the OAM, the gNB-CU constructs a UE CONTEXT MODIFICATION REQUEST message, and if a coordinated cell is to be added, the Coordinated Cell ID of the CoordinatedCellsToAddModList in the configuration message is configured as the added coordinated cell ID, and if a coordinated cell is to be deleted, the Coordinated Cell ID of the CoordinatedCellsToReleaseModList in the configuration message is configured as the deleted coordinated cell ID. gNB-DU establishes or deletes the corresponding coordinated cell for the MAC layer of the UE according to the coordinated cell configuration information in the message after the gNB-CU sends the UE CONTEXT MODIFICATION REQUEST message to the gNB-DU through the F1 interface and the gNB-DU receives the message. Then, the scheduler of the MAC layer of the UE may perform CoMP resource coordination according to the coordinated cell.

Figure 9:
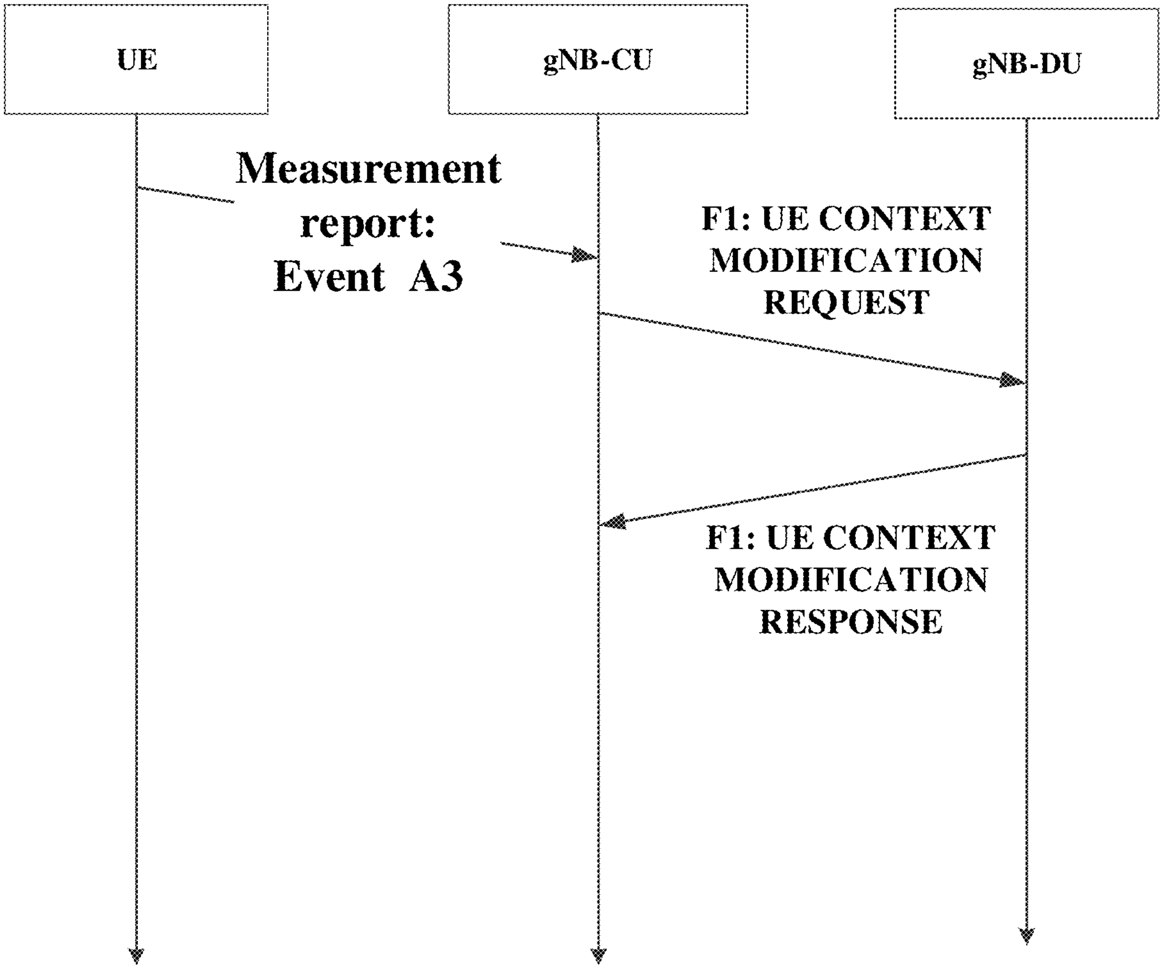
FIG. 9 is a flowchart of reporting an A3 event by the UE to establish a coordinated cell according to an embodiment of the present disclosure.

Referring to FIG. 9, the procedure that the UE reports the A3 event to establish the coordinated cell includes the following steps:

Step 1: a UE sends a measurement report to a gNB-CU;

Step 2: the gNB-CU sends the UE CONTEXT MODIFICATION REQUEST message to the gNB-DU through the F1 interface;

Step 3: the gNB-DU sends the UE CONTEXT MODIFICATION RESPONSE message to the gNB-CU through the F1 interface.

The coordinated cell is configured through the A3 event reported by UE. After the gNB-CU receives the A3 event reported by the UE after measurement, the gNB-CU selects the coordinated cell according to neighbor cell information in measurement reporting of the A3 event, and constructs the UE CONTEXT MODIFICATION REQUEST message. If the coordinated cell is to be added, the Coordinated Cell ID of the CoordinatedCellsToAddModList in the message is configured as the ID of the added coordinated cell; and if the coordinated cell is to be deleted, the Coordinated Cell ID of the CoordinatedCellsToReleaseModList in the message is configured as the ID of the deleted coordinated cell. The gNB-CU sends the UE CONTEXT MODIFICATION REQUEST message to the gNB-DU through the F1 interface. The gNB-DU establishes or deletes the corresponding coordinated cell for the MAC layer of the UE according to the coordinated cell configuration information in the message after receiving the message. Then, the scheduler of the MAC layer of the UE may perform CoMP resource coordination according to the coordinated cell.

Embodiment 2

A new F1 CoMP coordination resource interaction message is defined: an F1 CoMP coordination request message, an F1 CoMP coordination response message, and an F1 CoMP coordination reservation message.

(1) F1 CoMP Coordination Request Message

The transmission direction of the F1 CoMP coordination request message is gNB-Du→gNB-Cu.

TABLE 3

The format of the F1 COMP coordination request message.

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU UE F1AP ID | M | | 9.3.1.4 | | YES | reject |
| gNB-DU UE F1AP ID | M | | 9.3.1.5 | | YES | ignore |
| SpCell ID | O | | NR CGI 9.3.1.12 | Special Cell as defined in TS 38.321 [16]. For handover case, this IE is considered as target cell. SpCell ID | YES | reject |
| ServCellIndex | O | | INTEGER (0 . . . 31, . . . ) | ServCellIndex | YES | reject |
| COMPType | O | | ENUMERATED (JR, JT, UL-CS, DL-CS . . . , ) | | | |
| Frequency domain resource assignment | O | | BIT STRING (1 . . . 273, . . . ) | number of bits, Each position in the bitmap represents a PRB (first bit = PRB 0 and so on), for which value '"1" indicates 'PRB is reserved' and value "0" | YES | reject |

TABLE 3-continued

The format of the F1 COMP coordination request message.

| IE/Group Name | Presence | Range | IE type and reference | Semantics description | Criticality | Assigned Criticality |
|---|---|---|---|---|---|---|
| | | | | indicates 'not to reserve'. The maximum number of Physical Resource Blocks is 273. | | |

The F1 CoMP coordination request message may carry frequency-domain resource information requesting coordination.

(2) F1 CoMP Coordination Response Message

The transmission direction of the F1 CoMP coordination response message is gNB-CU→gNB-DU.

TABLE 4

The format of the F1 COMP coordination response message.

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU UE FIAP ID | M | | 9.3.1.4 | | YES | reject |
| gNB-DU UE F1AP ID | M | | 9.3.1.5 | | YES | ignore |
| CooridnatedResourceList | M | 1 . . . 20 | | | EACH | ignore |
| >System frame number, SFN | M | | INTEGER (0 . . . 1023) | System frame number | YES | ignore |
| >Slot | M | | INTEGER (0 . . . 9) | Slot number | YES | ignore |
| >Frequency domain resource assignment | M | | BIT STRING (1 . . . 273, . . . ) | number of bits, Each position in the bitmap represents a PRB (first bit = PRB 0 and so on), for which value "'1" indicates 'PRB is reserved' and value "0" indicates 'not to reserve'. The maximum number of Physical Resource Blocks is 273. | YES | ignore |

The F1 CoMP coordination response message carries information about the time slot and the corresponding frequency domain resource at which the coordination takes effect. The gNB-CU may be at most coordinate time-frequency resources for 20 slots at a time.

(3) F1 CoMP Coordination Reservation Message

The transmission direction of the F1 CoMP coordination reservation message is gNB-CU→gNB-DU.

TABLE 5

The format of the F1 COMP coordination response message.

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU UE F1AP ID | M | | 9.3.1.4 | | YES | reject |
| gNB-DU UE F1AP ID | M | | 9.3.1.5 | | YES | ignore |
| SpCell ID | M | | NR CGI 9.3.1.12 | Special Cell as defined in TS 38.321 [16]. For handover case, this IE is considered as target cell. SpCell ID | YES | reject |
| ServCellIndex | M | | INTEGER (0 . . . 31, . . . ) | ServCell Index | YES | reject |
| CoordinatedCellsList | M | 0 . . . <maxnoofCoordinatedCells> | | | EACH | ignore |
| >Coordinated Cell ID | M | | NR CGI 9.3.1.12 | Coordinated Cell Identifier in gNB | YES | ignore |
| >Cooridnated ServCellIndex | M | | INTEGER (0 . . . 31, . . . ) | ServCell Index | YES | ignore |
| CooridnatedResourceList | M | 1 . . . 20 | | | EACH | ignore |
| >SFN | M | | INTEGER (0 . . . 1023) | System frame number | YES | ignore |
| >Slot | M | | INTEGER (0 . . . 9) | Slot number | YES | ignore |
| COMPType | O | | ENUMERATED (JR, JT, UL-CS, DL-CS . . . ,) | Coordination type | Yes | ignore |
| >Frequency domain resource assignment | M | | BIT STRING (1 . . . 273, . . . ) | number of bits, Each position in the bitmap represents a PRB (first bit = PRB 0 and so on), for which value ""1" indicates 'PRB is reserved' and value "0" indicates 'not to reserve'. The maximum number of Physical Resource Blocks is 273. | YES | ignore |

The F1 coordination reservation message is used by the gNB-CU to notify the gNB-DU to reserve CoMP resources in the coordinated cell, and time-frequency resources may be coordinated for at most 20 time slots at a time.

Figure 10:
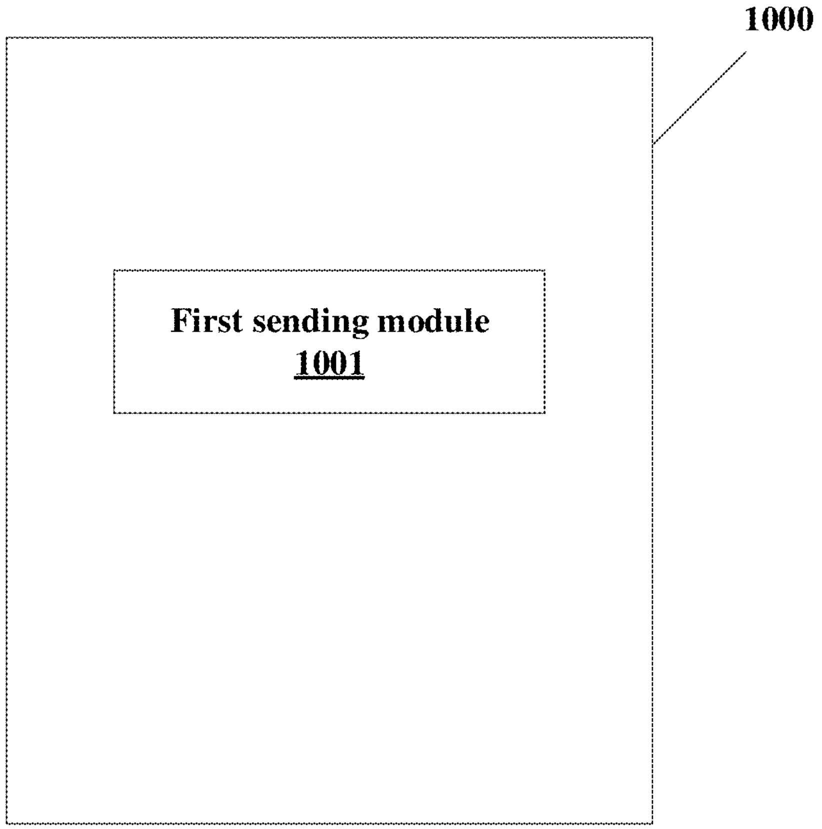
FIG. 10 is a schematic diagram of a transmission apparatus according to an embodiment of the present disclosure

Referring to FIG. 10, an embodiment of the present disclosure provides a transmission apparatus, where the apparatus is applied to a network side device, the network side device includes a CU and a DU, and the apparatus 1000 includes:

a first sending module 1001, configured to send a first message to the DU through a first interface, where the first message indicates information of a coordinated cell of a terminal configured by the DU.

The first interface is an interface between the CU and the DU, the first interface may also be described as an F1 interface, and it may be understood that a name of an interface between the CU and the DU is not limited.

Optionally, the first sending module 1001 is located in the CU.

In an implementation of the present disclosure, the coordinated cell of the terminal is a coordinated cell newly added to or deleted from a terminal context.

In an implementation of the present disclosure, the first message is a UE CONTEXT MODIFICATION REQUEST message, and the first message may also be another message, of course, it is not limited thereto.

In an implementation of the present disclosure, the UE CONTEXT MODIFICATION REQUEST message includes a predefined coordinated cell field (for example, a CoMP- CoordinatedCellInfo field), where the predefined coordinated cell field represents information about a coordinated cell of the terminal.

In an implementation of the present disclosure, the apparatus 1000 may further include: a first receiving module, configured to receive a second message; a first processing module, configured to determine the first message according to the second message.

Optionally, the first receiving module and the first processing module are located in the CU.

In an implementation of the present disclosure, the first receiving module is further configured to perform one of the following:

manner 1: receiving the second message from an OAM, where the second message indicates that the coordinated cell of the terminal is configured by the DU; and manner 2: receiving the second message from a terminal, where the second message is a measurement report reported by the terminal.

The measurement report may include a neighboring cell relationship measured by the UE.

Optionally, the second message includes: a list (CoordinatedCellsToAddModList) of newly added cells, where the list of newly added coordinated cells includes an identifier (Coordinated Cell ID) of a newly added coordinated cell; or, the second message includes a release list of coordinated cells (CoordinatedCellsToReleaseModList), and the release list of coordinated cells includes an identifier of a deleted coordinated cell.

In an implementation of the present disclosure, the apparatus 1000 may further include: a second processing module, configured to store information of the coordinated cell of the terminal in the MAC layer of the DU according to the information of the coordinated cell of the terminal, where the MAC layer of the DU performs CoMP resource coordination according to the coordinated cell of the terminal.

Optionally, the second processing module is located in the DU.

In an implementation of the present disclosure, the apparatus 1000 may further include: a second sending module, configured to send a third message (or described as an F1 CoMP coordination request message) to the CU through the first interface; the third message is used to request to reserve CoMP resources for CoMP coordinated interaction between the CU and the DU.

Optionally, the second sending module is located in the DU.

In an implementation of the present disclosure, the apparatus 1000 may further include: a second receiving module, configured to receive, through the first interface, a fourth message (or describe as an F1 CoMP coordinated response message) sent by the CU and configured to respond to the third message.

Optionally, the second receiving module is located in the DU.

In an implementation of the present disclosure, the fourth message may include a time unit (for example, a slot) in which CoMP coordination takes effect, and/or information about a CoMP resource corresponding to a time unit in which CoMP coordination takes effect.

In an implementation of the present disclosure, the apparatus 1000 may further include: a third sending module, configured to send a fifth message (or described as an F1 CoMP coordination reservation message) to the DU through the first interface; the fifth message is used to notify the DU to reserve CoMP resources for CoMP coordination interaction between the CU and the DU.

Optionally, the third sending module is located in the CU.

In an implementation of the present disclosure, the first message or the third message or the fourth message or the fifth message is further used to request interference coordination resources.

In an implementation of the present disclosure, the apparatus 1000 further includes: a fourth sending module, configured to send assistance information data (ASSISTANCE INFORMATION DATA) to the CU, and/or the CU sends the assistance information data to the DU; the assistance information data includes an assistance channel quality information (Radio Quality Assistance Information) type, and the assistance channel quality information type is used to determine whether to perform CoMP JR or CoMP JT.

Optionally, the fourth sending module is located in the DU.

In an implementation of the present disclosure, the apparatus 1000 further includes: an obtaining module, configured to obtain a measurement value of a serving cell; and a determining module, configured to determine whether to perform CoMP JR or CoMP JT according to the measurement value and the assistance channel quality information type.

Optionally, the obtaining module and the determining module are located in the DU and/or the CU.

In an implementation of the present disclosure, the assistance channel quality information type includes one or more of the following: (1) SRS RSRP; (2) TA; (3) SRS feature vector; (4) CSI-RS RSRP; (5) SSB RSRP.

In the embodiments of the present disclosure, the apparatus can implement each process implemented in the method embodiment shown in FIG. 7 of the present disclosure, and achieve the same beneficial effect, which will not be repeated here in order to avoid repetition.

Figure 11:
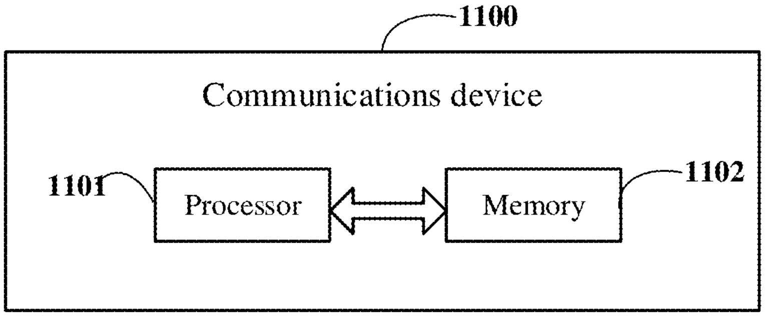
FIG. 11 is a schematic diagram of a communication device according to an embodiment of the present disclosure.

Optionally, as shown in FIG. 11, an embodiment of the present disclosure further provides a communication device 1100, including a processor 1101, a memory 1102, and a program or an instruction stored in the memory 1102 and executable on the processor 1101, where the program or the instruction, when executed by the processor 1101, implements each process of the method embodiment shown in FIG. 7, and can achieve the same technical effect, which is not described herein again in order to avoid repetition.

An embodiment of the present disclosure further provides a readable storage medium, where the readable storage medium stores a program or an instruction, and when the program or the instruction is executed by the processor, each process of the method embodiment shown in FIG. 7 is implemented, and the same technical effect can be achieved, which is not described herein again in order to avoid repetition.

The processor is a processor in the terminal in the foregoing embodiment. The readable storage medium includes a computer-readable storage medium, such as a computer-only memory (ROM), a random access memory (RAM), a magnetic disk, or an optical disk.

An embodiment of the present disclosure further provides a chip, where the chip includes a processor and a communication interface, the communication interface is coupled to the processor, and the processor is configured to run a program or an instruction, to implement each process of the foregoing information processing method embodiment, and achieve a same technical effect, and to avoid repetition, details are not described herein again.

It should be understood that the chip mentioned in the embodiments of the present disclosure may also be referred to as a system-level chip, a system chip, a chip system, an on-chip system chip, or the like.

It should be noted that, in this specification, the terms "include", "comprise", or any other variant thereof are intended to cover non-exclusive inclusion, so that a process, method, article, or apparatus that includes a series of elements includes not only those elements, but also other elements that are not explicitly listed, or elements inherent to the process, method, article, or apparatus. In the absence of more restrictions, identical elements after the statement "include an element" are not excluded from the process, method, article, or apparatus that includes the element. In addition, it should be noted that the scope of the method and apparatus in the embodiments of the present disclosure is not limited to the order shown or discussed, and may further include performing functions in a substantially simultaneous manner or in a reverse order according to the involved functions, for example, the described method may be performed in an order different from that described, and various steps may also be added, omitted, or combined. In addition, features described with reference to certain examples may be combined in other examples.

Through the description of the foregoing implementations, a person skilled in the art may clearly understand that the method in the foregoing embodiments may be implemented by means of software plus a necessary general hardware platform, and certainly may also be implemented by hardware, but in many cases, the former is a better implementation. Based on this understanding, the essential part or the part contributing to the prior art in the technical solution of the present disclosure may be embodied in the form of a computer software product, and the computer software product is stored in a storage medium (such as a ROM/RAM, a magnetic disk, and an optical disk), and includes several instructions for enabling a terminal (which may be a mobile phone, a computer, a server, an air conditioner, a network side device, etc.) to perform the method according to the embodiments of the present disclosure.

It should be noted that the division of the foregoing modules is merely a division of logical functions, and may be completely or partially integrated into one physical entity during actual implementation, or may be physically separated. The modules may all be implemented in a form of software invoked by a processing element, or may all be implemented in a form of hardware; or some modules may be implemented in a form of invoking software by using a processing element, and some modules are implemented in a form of hardware. For example, the determining module may be a separately established processing element, or may be integrated in a chip of the foregoing apparatus, or may be stored in a memory of the apparatus in a form of program codes, and a certain processing element of the apparatus invokes and executes the functions of the foregoing determining module. Implementation of other modules is similar. In addition, all or part of these modules may be integrated together, or may be implemented independently. The processing element described herein may be an integrated circuit having a signal processing capability. In an implementation process, steps of the foregoing method or the foregoing modules may be completed by using an integrated logic circuit of hardware in the processor element or an instruction in a form of software.

For example, each module, unit, subunit, or sub-module may be one or more integrated circuits configured to implement the above method, for example, one or more Application Specific Integrated Circuit (ASIC), or one or more microprocessors (DSP), or one or more field programmable gate arrays (FPGA). For another example, when the foregoing module is implemented in a form of scheduling program codes by using a processing element, the processing element may be a general-purpose processor, for example, a central processing unit (Central Processing Unit, CPU), or another processor that can invoke the program codes. For another example, these modules may be integrated together and implemented in a form of a system-on-a-chip (SOC).

In the specification and claims of the present disclosure, the terms "first", "second", and the like are intended to distinguish between similar objects, and are not necessarily used to describe a specific order or sequence. It should be understood that the terms used in this way can be interchanged under appropriate circumstances, so that the embodiments of the present disclosure described herein, for example, are implemented in an order other than those illustrated or described herein. In addition, the terms "include" and "have" and any deformation thereof are intended to cover a non-exclusive inclusion, for example, a process, method, system, product, or device that includes a series of steps or units is not necessarily limited to those steps or units listed clearly, but may include other steps or units that are not clearly listed or inherent to these processes, methods, products, or devices. In addition, the specification and claims use "and/or" to refer to at least one of the connected objects, such as A and/or B and/or C, representing the presence of A, B alone, C alone, and both A and B, both B and C exist, both A and C exist, and A, B and C both exist. Similarly, use of "at least one of A and B" in this specification and claims should be understood as "A alone, B alone, or both A and B".

The embodiments of the present disclosure are described above with reference to the accompanying drawings, but the present disclosure is not limited to the specific embodiments described above, and the specific embodiments described above are merely illustrative, rather than limiting, and a person of ordinary skill in the art can make many forms without departing from the spirit of the present disclosure and the scope of the claims, all of which are within the protection of the present disclosure.

What is claimed is:

1. A transmission method performed by a network side device, wherein the network side device comprises a central unit CU and a distribution unit DU, and the method comprises:

sending a first message to the DU by the CU through a first interface, wherein the first message indicates information of a coordinated cell of a terminal configured by the DU, wherein the method further comprises:

receiving a second message by the CU; and determining the first message by the CU based on the second message.

2. The method according to claim 1, wherein the coordinated cell of the terminal is a coordinated cell newly added to or deleted from a terminal context.

3. The method according to claim 1, wherein the first message is a terminal context modification request message.

4. The method according to claim 3, wherein the terminal context modification request message comprises a predefined coordinated cell field, and the predefined coordinated cell field represents the information of the coordinated cell of the terminal.

5. The method according to claim 1, wherein receiving the second message by the CU comprises:

receiving the second message by the CU from an Operation Administration and Maintenance Management (OAM), wherein the second message indicates that the coordinated cell of the terminal is configured by the DU; or, receiving the second message from the terminal by the CU, wherein the second message is a measurement report reported by the terminal.

6. The method according to claim 5, wherein the second message comprises a list of newly added coordinated cells, and the list of newly added coordinated cells comprises an identity of a newly added coordinated cell;

or the second message comprises a coordinated cell release list, and the coordinated cell release list comprises an identity of a deleted coordinated cell.

7. The method according to claim 1, wherein the method further comprises:

storing the information of the coordinated cell of the terminal in a Media Access Control (MAC) layer of the DU by the DU according to the information of the coordinated cell of the terminal, wherein the MAC layer of the DU performs Coordinated Multiple Points (COMP) resource coordination according to the coordinated cell of the terminal.

8. The method according to claim 7, wherein the method further comprises:

sending a third message to the CU by the DU through the first interface; wherein the third message is configured to request to reserve COMP resources for COMP coordination interaction between the CU and the DU.

9. The method according to claim 8, wherein the method further comprises:

receiving, by the DU through the first interface, a fourth message sent by the CU and configured to respond to the third message.

10. The method according to claim 9, wherein the fourth message comprises a time unit in which COMP coordination takes effect, and/or information about a COMP resource corresponding to a time unit in which COMP coordination takes effect.

11. The method according to claim 8, wherein the method further comprises:

sending a fifth message by the CU to the DU through the first interface; wherein the fifth message is configured to notify the DU to reserve COMP resources for COMP coordination interaction between the CU and the DU.

12. The method according to claim 11, wherein the first message or the third message or the fifth message is further configured to request interference coordination resources.

13. The method according to claim 1, wherein the method further comprises:

sending assistance information data to the CU by the DU, and/or sending assistance information data to the DU by the CU; wherein the assistance information data comprises an assistance channel quality information type, and the assistance channel quality information type is configured to determine whether to perform COMP joint reception JR or COMP downlink joint transmission JT.

14. The method according to claim 13, wherein the method further comprises:

obtaining a measurement value of a serving cell by the CU and/or the DU;

determining whether to perform the CoMP JR or the COMP JT according to the measurement value and the assistance channel quality information type by the CU and/or the DU.

15. The method according to claim 13, wherein the assistance channel quality information type comprises one or more of the following:

a reference signal received power of a sounding reference signal;

a timing advance;

a sounding reference signal feature vector;

a reference signal received power of a channel state information reference signal;

a reference signal received power of a synchronization signal block.

16. A network side device, comprising: a processor, a memory, and a program stored in the memory and executable on the processor, wherein when the program is executed by the processor, the processor implements a transmission method, wherein the network side device comprises a central unit CU and a distribution unit DU, and the method comprises:

sending a first message to the DU by the CU through a first interface, wherein the first message indicates information of a coordinated cell of a terminal configured by the DU;

wherein the method further comprises:

receiving a second message by the CU; and determining the first message by the CU based on the second message.

17. A non-transitory readable storage medium storing a program or an instruction, wherein when the program or the instruction is executed by a processor, the processor implements a transmission method applied to a network side device, wherein the network side device comprises a central unit CU and a distribution unit DU, and the method comprises:

sending a first message to the DU by the CU through a first interface, wherein the first message indicates information of a coordinated cell of a terminal configured by the DU, wherein the method further comprises:

receiving a second message by the CU; and determining the first message by the CU based on the second message.

18. The network side device according to claim 16, wherein the coordinated cell of the terminal is a coordinated cell newly added to or deleted from a terminal context.

19. The network side device according to claim 16, wherein the first message is a terminal context modification request message.

20. The method according to claim 9, wherein the fourth message is further configured to request interference coordination resources.

* * * * *